United States Patent
Iwai (10) Patent No.: US 7,877,428 B2
(45) Date of Patent: Jan. 25, 2011

(54) PROCESSOR SYSTEM INCLUDING PROCESSOR AND COPROCESSOR

(75) Inventor: Daisuke Iwai, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 927 days.

(21) Appl. No.: 11/741,146

(22) Filed: Apr. 27, 2007

(65) Prior Publication Data

US 2007/0255776 A1  Nov. 1, 2007

(30) Foreign Application Priority Data

May 1, 2006  (JP) .............................. 2006-127761

(51) Int. Cl.
*G06F 15/00* (2006.01)
(52) U.S. Cl. ..................................... 708/200
(58) Field of Classification Search .................. 708/200
See application file for complete search history.

(56) References Cited

U.S. PATENT DOCUMENTS

| | | | | |
|---|---|---|---|---|
| 5,212,775 A | * | 5/1993 | Bikowsky et al. | 710/310 |
| 5,748,650 A | * | 5/1998 | Blaker et al. | 714/786 |
| 6,675,290 B1 | | 1/2004 | Miyamori | |
| 2002/0091826 A1 | * | 7/2002 | Comeau et al. | 709/226 |

FOREIGN PATENT DOCUMENTS

| JP | 7-44401 | 2/1995 |
|---|---|---|
| JP | 2000-276352 | 10/2000 |
| JP | 2001-75804 | 3/2001 |

* cited by examiner

*Primary Examiner*—Tan V Mai
(74) *Attorney, Agent, or Firm*—Oblon, Spivak, McClelland, Maier & Neustadt, L.L.P.

(57) ABSTRACT

A processor includes a first register, a control section and an arithmetical section. The processor has a first operation mode which allows the first area of a first register to be accessed and a second operation mode which allows a second area of the first register to be accessed. The first register includes the first area capable of holding data and the second area provided in the second operation mode and inhibited from holding data. The control section generates an address corresponding to the second area accessed in the second operation mode and is capable of reading data from an external memory device using the generated address. The arithmetical section, in the first operation mode, performs an arithmetical operation using the data held in the accessed first area and, in the second operation mode, performs an arithmetical operation using the data read at the control section.

9 Claims, 12 Drawing Sheets

FIG. 1

Arithmetical section

First operation mode

FIG. 5

Second operation mode

| Contents of operation (8 bits) | Register number ="0001" | Register number ="1010" |

PROCESSOR SYSTEM INCLUDING PROCESSOR AND COPROCESSOR

CROSS-REFERENCE TO RELATED APPLICATIONS

This application is based upon and claims the benefit of priority from prior Japanese Patent Application No. 2006-127761, filed May 1, 2006, the entire contents of which are incorporated herein by reference.

BACKGROUND OF THE INVENTION

1. Field of the Invention

This invention relates to a processor system including a processor and a coprocessor, and more particularly to a method of transferring data from the processor to the coprocessor in a configuration having a processor and a coprocessor.

2. Description of the Related Art

In multimedia processes, including audio codec, multiplication and accumulation (MAC) processes are frequently used. A MAC process is one wherein an input signal is multiplied at a given time, the result accumulated, the next input signal multiplied at the next time, the result of the multiplication added to the accumulated result of the preceding multiplication, and the result accumulated.

In a multimedia processing LSI, a configuration including a processor and a coprocessor has been known. As for such a configuration, for example, Jpn. Pat. Appln. KOKAI Publication No. 2001-075804 has disclosed a configuration in which a coprocessor transfers the necessary data to a coprocessor and then the coprocessor performs MAC processes.

However, the conventional configuration has a problem: the transfer of data from the processor to the coprocessor takes time and therefore the arithmetic processing efficiency is poor.

BRIEF SUMMARY OF THE INVENTION

A processor, having a first operation mode which allows a first area of a first register to be accessed and a second operation mode which allows a second area of the first register to be accessed, according to an aspect of the present invention includes:

the first register which includes the first area capable of holding data and the second area provided in the second operation mode and inhibited from holding data;

a control section which generates an address corresponding to the second area accessed in the second operation mode and is capable of reading data from an external memory device using the generated address; and an arithmetical section which, in the first operation mode, performs an arithmetical operation using the data held in the accessed first area and, in the second operation mode, performs an arithmetical operation using the data read at the control section.

A processor system according to an aspect of the present invention includes:

a first processor which includes a memory device holding data; and a second processor which includes a first register and performs an arithmetical operation on the data according to an arithmetic instruction given by the first processor, the arithmetic instruction including an access instruction for a first area of the first register in a first operation mode and an access instruction for a second area of the first register in a second operation mode, the second processor including the first register which includes the first area capable of holding data and the second area provided in the second operation mode and inhibited from holding data;

a control section which generates an address in the memory device corresponding to the second area accessed in the second operation mode and is capable of reading data from the memory device using the generated address; and an arithmetical section which, in the first operation mode, performs an arithmetical operation using the data held in the accessed first area and, in the second operation mode, performs an arithmetical operation using the data read at the control section.

An image processing apparatus according to an aspect of the present invention includes:

a video processing circuit which carries out a video compression process and a video decompression process; and an audio processing circuit which carries out an audio compression process and an audio decompression process, the audio processing circuit including a first processor which includes a memory device holding data; and a second processor which includes a first register and performs an arithmetical operation on the data according to an arithmetic instruction given by the first processor, the arithmetic instruction including an access instruction for a first area of the first register in a first operation mode and an access instruction for a second area of the first register in a second operation mode, the second processor including the first register which includes the first area capable of holding data and the second area provided in the second operation mode and inhibited from holding data;

a control section which generates an address in the memory device corresponding to the second area accessed in the second operation mode and is capable of reading data from the memory device using the generated address; and an arithmetical section which performs an arithmetical operation necessary for the audio compression and decompression processes using the data held in the accessed first area in the first operation mode and using the data read in the control section in the second operation mode.

DETAILED DESCRIPTION OF THE INVENTION

First Embodiment

Figure 1:
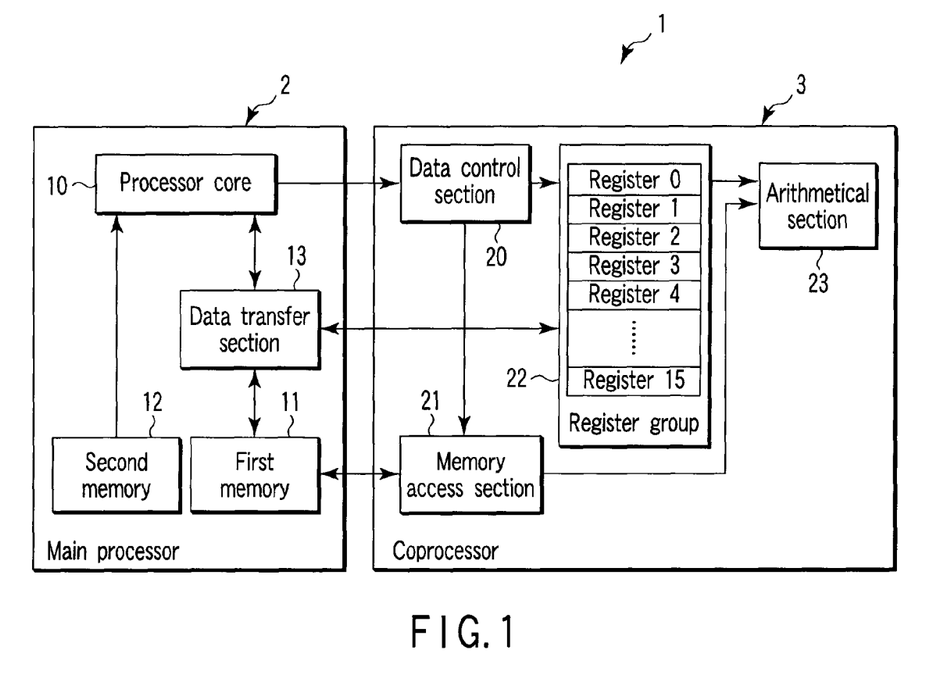
FIG. 1 is a block diagram of a system LSI according to a first embodiment of the present invention.

A processor and a processor system according to a first embodiment of the invention will be explained with reference to FIG. 1. FIG. 1 is a block diagram of a system LSI according to the first embodiment.

As shown in FIG. 1, the system LSI of the first embodiment comprises a main processor 2 and a coprocessor 3. The main processor 2 includes a processor core 10, a first memory 11, a second memory 12, and a data transfer section 13. The first memory 11 holds data used in the processor core 10 and coprocessor 3. The second memory 12 holds an arithmetic instruction used in the processor core 10. The data transfer section 13 loads or stores data into the first memory 11 and coprocessor 3. The processor core 10 executes the arithmetic instruction read from the second memory 12 according to the data read from the first memory 12 by the data transfer section 13. Then, the processor core 10 instructs the data transfer section 13 to store the result of the operation into the first memory 11. The processor core 10 further instructs the coprocessor 3 to perform an arithmetical operation.

The coprocessor 3 performs an arithmetical operation according to the instruction given by the processor core 10. The coprocessor 3 includes a data control section 20, a memory access section 21, a register group 22, and an arithmetical section 23. In response to an arithmetic instruction given by the processor core 10, the data control section 20 transfers data from the register group 22 to the arithmetical section 23 and instructs the memory access section 21 to read data from the first memory. In response to the instruction given by the data control section 20, the memory access section 21 reads the data from the first memory 11 and outputs it to the arithmetical section 23. The memory access section 21 will be described in detail later. The register group 22 includes a plurality of registers each of which can hold data. In the embodiment, explanation will be given using a case where the register group 22 includes 16 registers. The individual registers are called register 0 to register 15, respectively. Of course, the number of registers is not limited to 16 and may be, for example, 8 or 32. The data transfer section 13 loads the data in the first memory into register 0 to register 15. The arithmetical section 23 performs an arithmetical operation on the basis of the data given by the register group 22 and/or memory access section 21.

Figure 2:
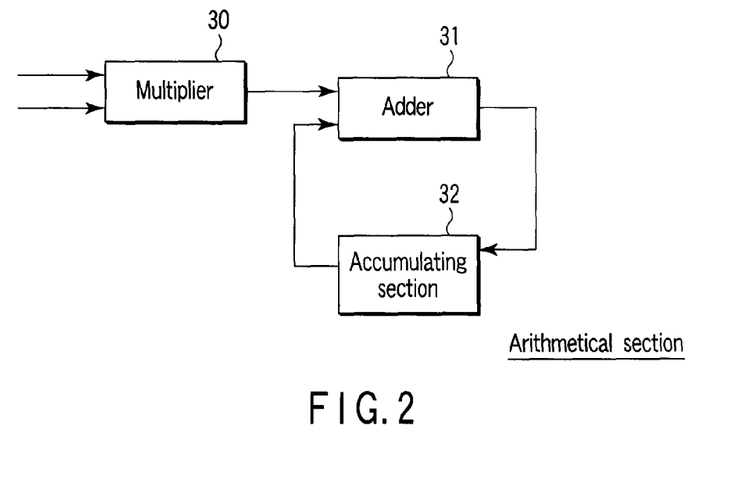
FIG. 2 is a block diagram of an arithmetical section included in the system LSI of the first embodiment.

FIG. 2 is a block diagram of the arithmetical section 23. As shown in FIG. 2, the arithmetical section 23 includes a multiplier 30, an adder 31, and an accumulating section 32. The multiplier 30 multiplies data given by the register group 22 and/or memory cell access section 21. The adder 31 adds the result of the multiplication at the multiplier 30 and the data accumulated at the accumulating section 32. The accumulating section 32 accumulates the results of the addition at the adder. That is, the arithmetical section 23 performs MAC processing. The arithmetical operation performed by the arithmetical section is not limited to MAC processing and may be another arithmetical operation.

Figure 3:
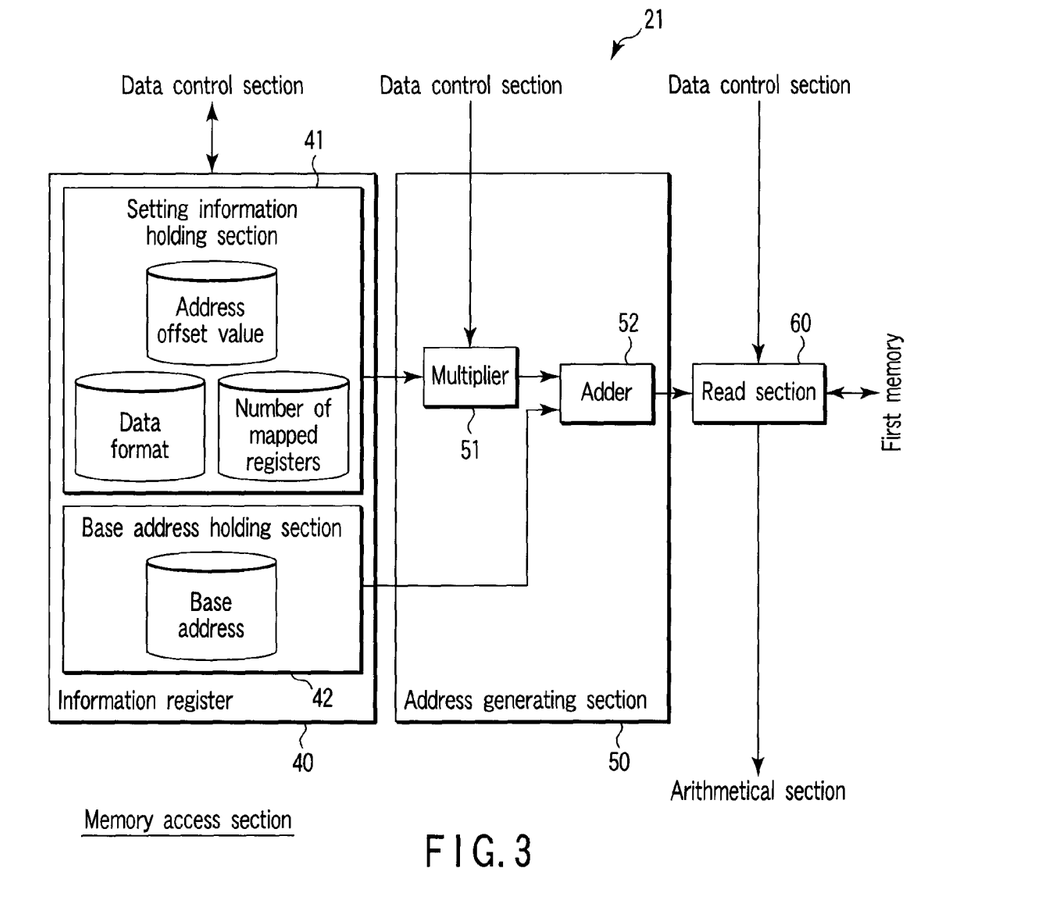
FIG. 3 is a block diagram of a memory access section included in the system LSI of the first embodiment.

FIG. 3 is a block diagram of the memory access section 21. As shown in FIG. 3, the memory access section 21 includes an information register 40, an address generating section 50, and a read section 60. The information register 40 includes a setting information holding section 41 and a base address holding section 42. The setting information holding section 41 holds information about an address offset value, the number of memory-mapped registers, and data format. The base address holding section 42 holds a base address. The address offset value, the number of memory-mapped registers, and the base address will be descried later. The data format is information on the format of data dealt with, such as information on whether to use a negative value.

The address generating section 50 includes a multiplier 51 and an adder 52. The multiplier 51 multiplies register order n given by the data control section 20 and the address offset value held in the setting information holding section 41. Register order n will be explained later. The adder 52 adds the result of multiplication at the multiplier 51 and the base address held in the base address holding section 42.

The read section 60 reads the data held in the address corresponding to the result of the addition at the adder 52 in the first memory 11 of the main processor 2. Then, the read section outputs the read-out data to the arithmetical section 23.

The system LSI 1 with the above configuration has two operation modes. Hereinafter, the two operation modes are referred to as a first operation mode and a second operation mode, respectively. The first operation mode, second operation mode, the address offset value, the number of memory-mapped registers, base address, and register order n will be explained below.

Figure 4:
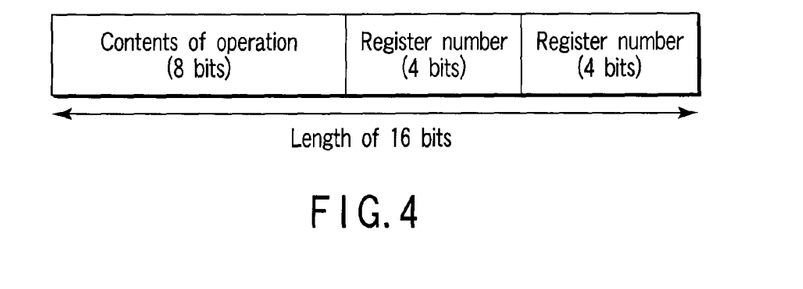
FIG. 4 is a conceptual diagram showing the structure of an instruction issued by the main processor in the system LSI of the first embodiment.

FIG. 4 is a conceptual diagram showing the contents of an arithmetic instruction given from the processor core 10 to the data control section 20. As shown in FIG. 4, the arithmetic instruction, which is a 16-bit fixed-length instruction, includes the contents of the operation and two register numbers. A register number specifies any one of register 1 to register 15 in the register group 22. Each of the register numbers is 4-bit fixed-length data. For example, when the contents of the calculation are MAC processing and the register numbers are "0" and "1" respectively, the arithmetic instruction means that "do MAC processing using the data held in register 0 and the data held in register 1."

Figure 5:
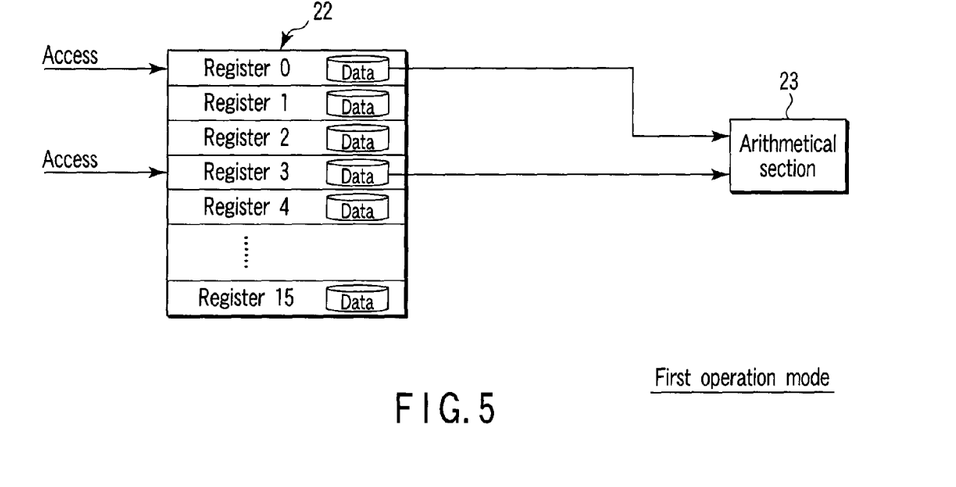
FIG. 5 is a block diagram of a register group and the arithmetical section included in the system LSI of the first embodiment.

FIG. 5 is a block diagram of the register group 22 and arithmetical section 23 in the first operation mode. The first operation mode is an operation mode in which all of register 0 to register 15 included in the register group 22 are allowed to hold data. In FIG. 5, while all of register 0 to register 15 hold data, there may be a case where only part of register 0 to register 15 hold data. Then, the data control section 20 outputs to the arithmetical section 23 the data in the register in the register group 22 corresponding to the register number included in the arithmetic instruction given by the processor core 10. For example, the register numbers in the arithmetic instruction are "0000" and "0011," the data control section 20 outputs the data held in register 0 and register 3 to the arithmetical section 23 (see FIG. 5). On the basis of these items of data, the arithmetical section 23 performs MAC processing.

Figure 6:
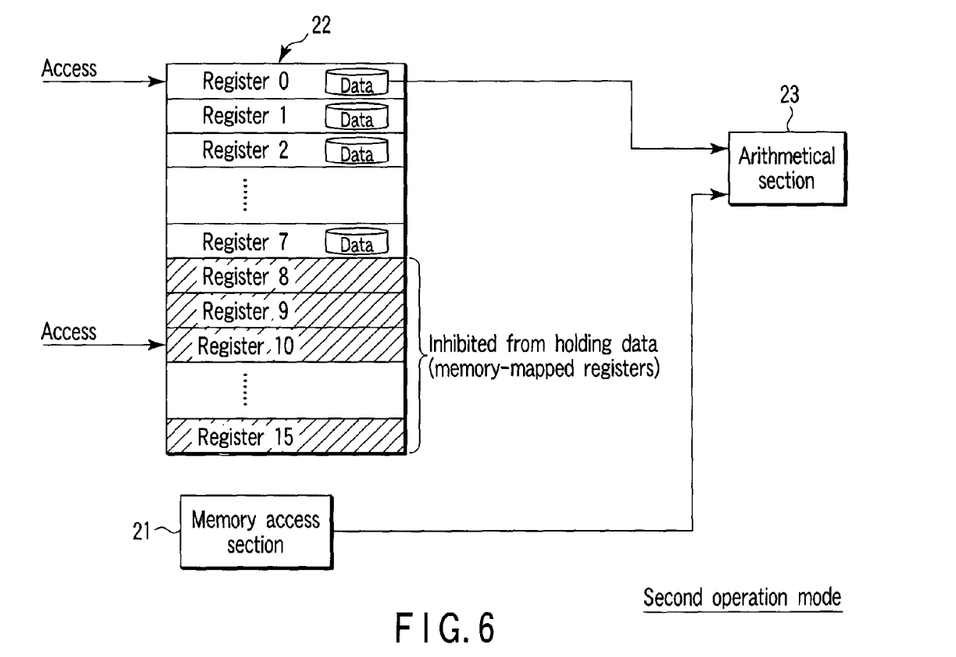
FIG. 6 is a block diagram of the register group, arithmetical section, and memory access section included in the system LSI of the first embodiment.

Next, the second operation mode will be explained using FIG. 6. FIG. 6 is a block diagram of the register group 22, arithmetical section 23, and memory access section 21 in the second operation mode. The second operation mode is an operation mode in which any of register 0 to register 15 in the register group 22 is inhibited from holding data. FIG. 6 shows a case where register 8 to register 15 are inhibited from holding data. Hereinafter, a register inhibited from holding data is referred to as a memory-mapped register. As shown in FIG. 6, the memory-mapped registers are shown by hatched portions. If the register selected by the arithmetic instruction is not a memory-mapped register, data is read from the selected register as in the first operation mode. If the memory-mapped register has been selected, data is not read from the memory-mapped register. FIG. 6 shows such a case. For example, suppose the register numbers in the arithmetic instruction are "0000" and "1010." Then, the register 10 corresponding to the register number="1010" is a memory-mapped register. Accordingly, the data control section 20 does not read the data from the register 10. Instead, the data control section 20 instructs the memory access section 21 to read the data from the first memory 11 in the main processor 2. Then, using the data read by the memory access section 21 and the data held in register 0, the arithmetical section 23 performs MAC processing. Each of the registers used as a memory-mapped register is caused to correspond to any one of the addresses in the first memory 11. The correspondence is held in the memory access section 21.

Figure 7:
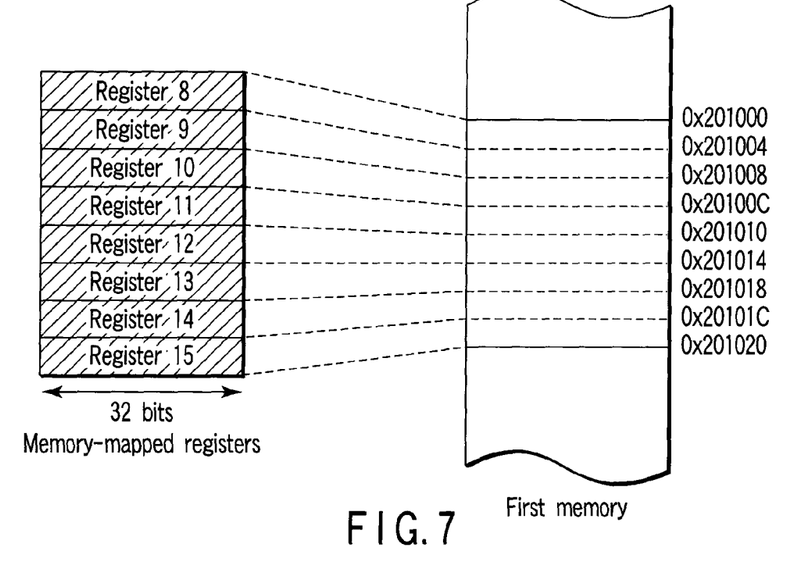
FIG. 7 is a conceptual diagram showing the correspondence between a memory-mapped register included in the system LSI of the first embodiment and a memory space of a first memory.

An example of the correspondence between the memory-mapped register and the first memory 11 will be explained using FIG. 7. FIG. 7 includes a block diagram of register 8 to register 15 and a conceptual diagram of a memory space of the first memory 11 corresponding to the block diagram.

As shown in FIG. 7, the memory space of the first memory 11 is allocated to the registers, starting with register 8 sequentially. Each of register 8 to register 15 has a bit length of 32 bits. Suppose the begin address in an area corresponding to register 8 in the first memory 11 is "0x201000." Then, register 8 corresponds to an area of addresses "0x201000" to "0x201003" in the first memory 11. Register 9 corresponds to an area of addresses "0x201004" to "0x201007." Register 10 corresponds to an area of addresses "0x201008" to "0x20100B." The same holds true for up to register 15. Here, "0x" written at the beginning of an address means that the address is represented in hexadecimal.

The base address is the begin address in the first memory 11 in the register whose register number is the lowest among the registers used as memory-mapped registers. Therefore, in the example of FIG. 7, the begin address "0x201000" corresponding to register 8 is the base address.

The address offset value indicates a variation in the address in the first memory 11 when the register number of the register used as a memory-mapped register is increased by "+1". Accordingly, in the example of FIG. 7, "0x000004" is an address offset value. The address offset value may be represented by, for example, the bit length of the data, not by a variation in the address itself. Specifically, the address offset value may be represented by data width="32 bits" instead of "0x000004". The relationship between the address offset value and the data width is as follows. When data width="8 bits", a variation in the address is "0x000001". When data width="16 bits", a variation in the address is "0x000002". When data width="64 bits", a variation in the address is "0x000008".

The aforementioned register order n indicates what number register from the register with the lowest register number is the register selected by the arithmetic instruction, when the selected register is used as a memory-mapped register. For example, in the example of FIG. 7, since register 8 has the lowest register number in the memory-mapped register, it follows that n=0. For register 9, n=1. For register 10, n=2. The same holds true for up to register 15.

Figure 8:
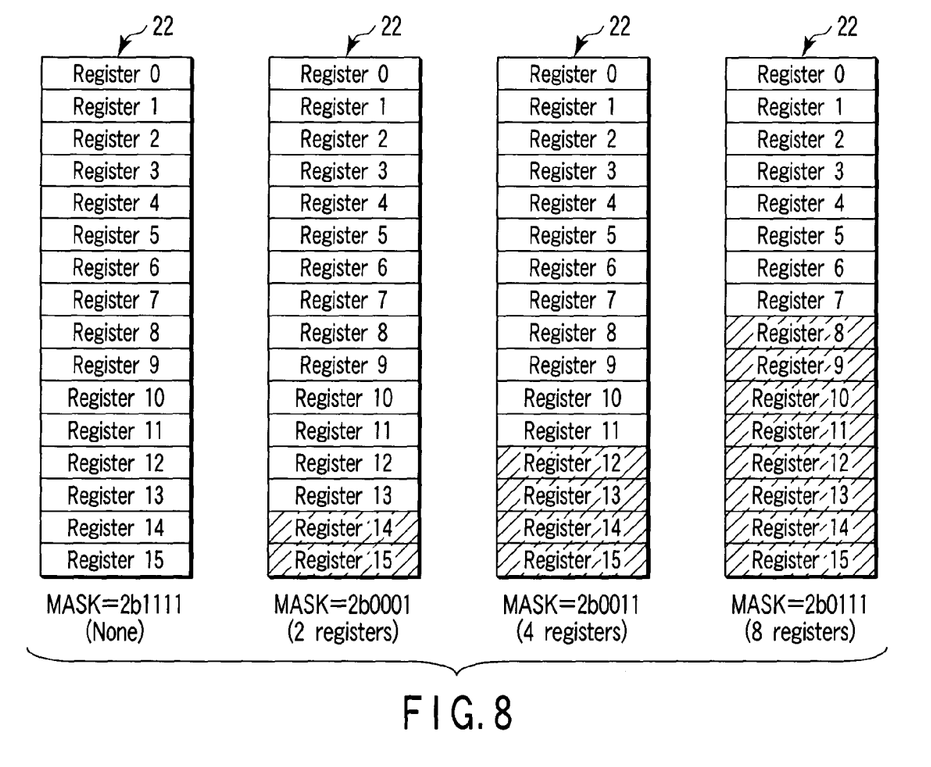
FIG. 8 is a block diagram of the register group included in the system LSI of the first embodiment.

The number of memory-mapped registers is the number of registers used as memory-mapped registers in the register group 22. In the example of FIG. 7, the number of memory-mapped registers is "8". More specifically, the setting information holding section 41 holds the value of data MASK= (the number of memory-mapped registers−1) as information indicating the number of memory-mapped registers. For example, if the number of memory-mapped registers is 8, the setting information holding section 41 holds MASK="2b1000"−"2b0001"="2b0111." When the number of memory-mapped registers is 0, 2, 4, and 8, the register group 22 takes the states as shown in FIG. 8. FIG. 8 is a block diagram of the register group 22. Here, "2b" written at the beginning of MASK means it is represented in binary.

As shown in FIG. 8, none of register 0 to register 15 are not used as memory-mapped registers, the number of memory-mapped registers is 0, giving MASK="2b1111." When register 14 and register 15 are used as memory-mapped registers, the number of memory-mapped registers is "2", giving MASK="2b0001". When register 12 to register 15 are used as memory-mapped registers, the number of memory-mapped registers is "4", giving MASK="2b0011". When register 8 to register 15 are used as memory-mapped registers, the number of memory-mapped registers is "8", giving MASK "2b0111." As described above, registers as memory-mapped registers are used in descending order of register numbers.

Figure 9:
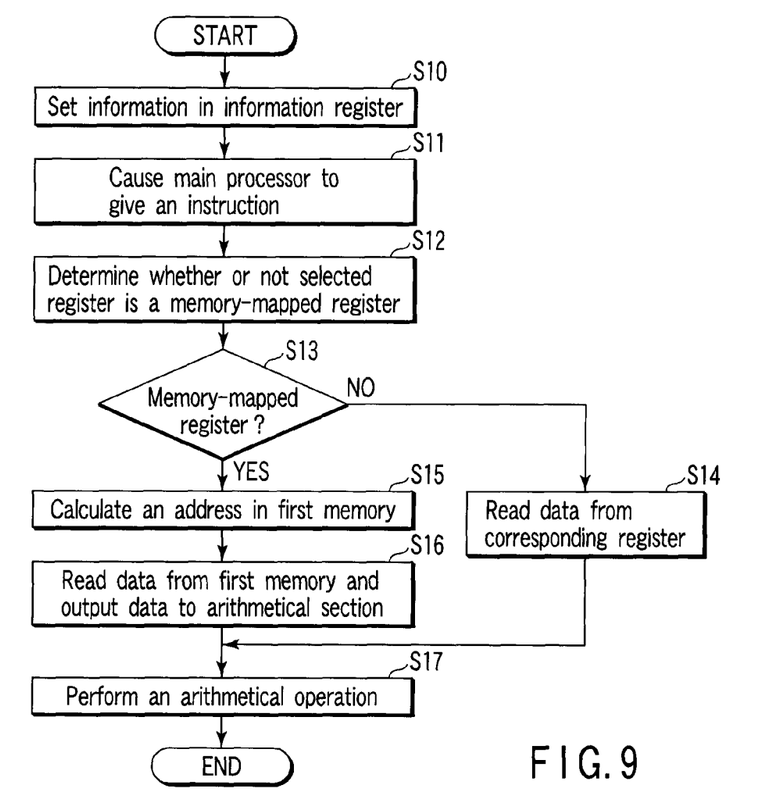
FIG. 9 is a flowchart to help explain the operation of the system LSI according to the first embodiment.

Next, the operation of the system LSI 1 with the above configuration will be explained, particularly centering on the operation of the coprocessor 3. FIG. 9 is a flowchart to help explain MAC processing performed in the system LSI 1.

As shown in FIG. 9, before the processing, the data control section 20 sets various pieces of information in the information register 40 (step S10). Specifically, the address offset value, the number of memory-mapped registers, the data format, and the base address are held in the information register 40.

Next, the processor core 10 of the main processor 2 gives an arithmetic instruction to perform MAC processing with the configuration explained in FIG. 4 to the data control section 20 of the coprocessor 3 (step S11). Referring to the number of memory-mapped registers held in the setting information holding section 41, the data control section 20 determines whether the register corresponding to the register number in the arithmetic instruction has been used as a memory-mapped register (step S12).

If it has been determined that the register has not been used as a memory-mapped register (NO in step S13), the data control section 20 reads the data from the register corresponding to the register number and outputs the data to the arithmetical section 23 (step S14). Alternatively, the data control section 20 instructs the register corresponding to the register number to output the data to the arithmetical section 23.

Figure 10:
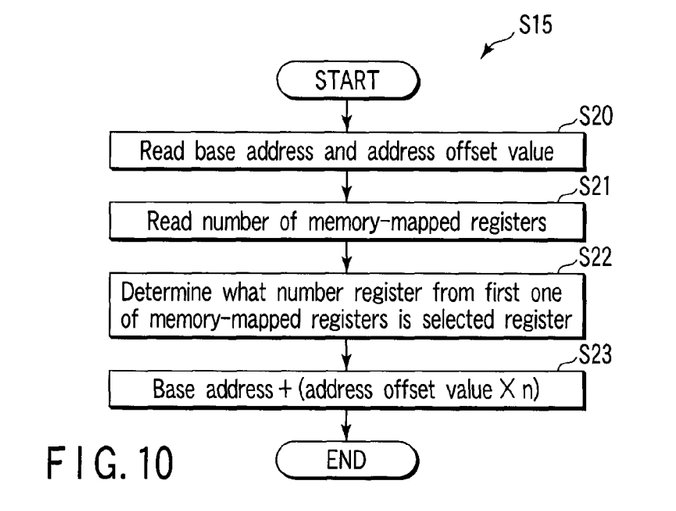
FIG. 10 is a flowchart to help explain address calculations in the system LSI of the first embodiment.

If it has been determined in step S12 that the register has been used as a memory-mapped register (YES in step S13), the data control section 20 calculates the address for the area corresponding to the register selected at the first memory 11 (step S15). The details of step S15 will be explained using FIG. 10. FIG. 10 is a flowchart to help explain the details of step S15.

First, the address generating section 50 of the memory access section 21 reads the base address and address offset value held in the base address holding section 41 and setting information holding section 41 respectively (step S20). The data control section 20 reads the number of memory-mapped registers held in the setting information holding section 41 of the information register 40 (step S21).

Next, from the number of memory-mapped registers and the register number in the arithmetic instruction, the data control section 20 determines what number register in the memory-mapped registers is the relevant register (step S22). Then, the data control section 20 outputs the register order n to the address generating section 50.

Then, the address generating section multiplies the address offset value and the register order n and adds the base address to the result of the multiplication (step S23). The result of the addition is the address in the first memory 11.

Using FIG. 9, the explanation will be continued. After step S15, the read section 60 of the memory access section 21 reads the data from the area to which the address obtained in step S15 in the first memory 11 has been allocated and outputs the read-out data to the arithmetical section 23 (step S16). Then, the arithmetical section 23 performs MAC processing on the given data (step S17).

Figure 11:
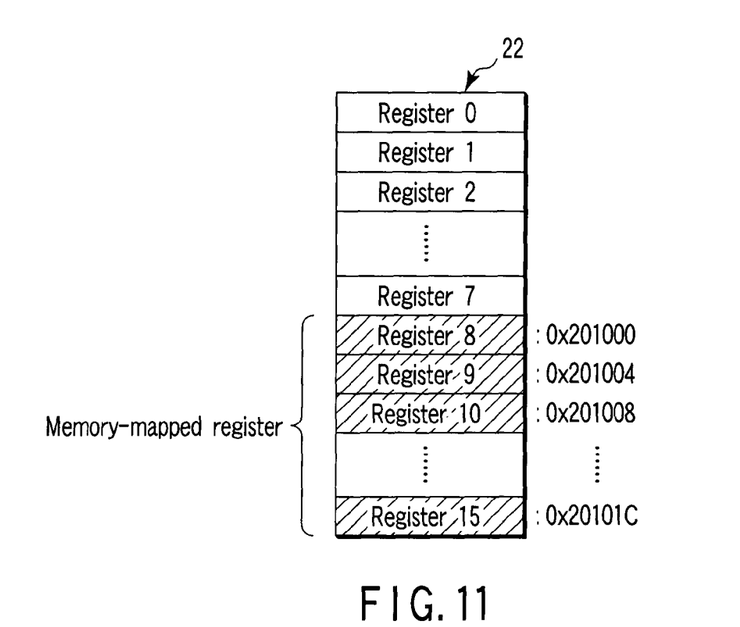
FIG. 11 is a block diagram of the register group included in the system LSI of the first embodiment.

A concrete example of the above processing will be explained below. For example, suppose the register group 22 is as shown in FIG. 11. FIG. 11 is a block diagram of the register group 22. As shown in FIG. 11, of 16 registers, register 8 to register 15 are used as memory-mapped registers. Suppose the bit length of each of the registers is 32 bits and the correspondence between the individual registers and the addresses in the first memory 11 is as show in FIG. 7. In FIG. 11, each of the numbers put to the right of register 8 to register 15 is the begin address of the area in the first memory 11 corresponding to the relevant register.

Figure 12:
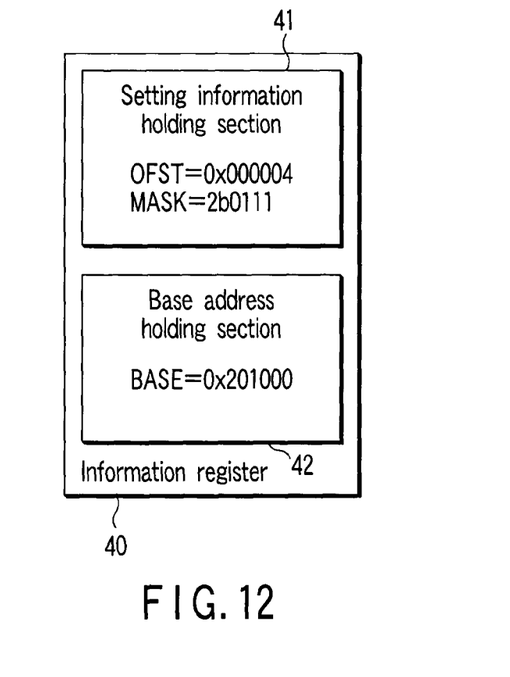
FIG. 12 is a conceptual diagram of an information register included in the system LSI of the first embodiment.

First, the data control section 20 sets various pieces of information in the information register 40 (step S10). Specifically, the data control section 20 stores "0x000004" as an address offset value (OFST) and 8 as the number of memory-mapped registers, that is, MASK="2b0111," in the setting information holding section 41. Moreover, the data control section 20 stores "0x201000" as a base address (BASE) in the base address holding section 42. FIG. 12 is a conceptual diagram of the information register when the process in step S10 has been carried out.

Figure 13:
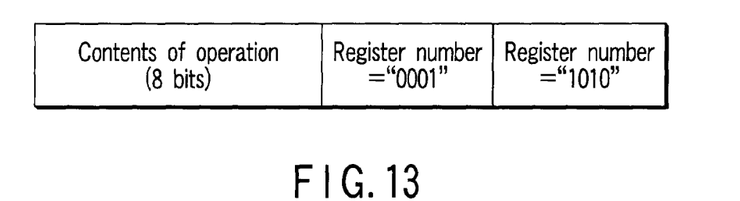
FIG. 13 is a conceptual diagram of the configuration of an instruction issued by the main processor in the system LSI of the first embodiment.

Next, the processor core 10 of the main processor 2 gives an arithmetic instruction to perform MAC processing to the data control section 20 of the coprocessor 3 (step S11). An example of the arithmetic instruction is shown in FIG. 13. FIG. 13 is a conceptual diagram of the arithmetic instruction. As shown in FIG. 13, register numbers "0001" and "1010" are selected in the arithmetic instruction. That is, the arithmetic instruction is an instruction to find out the sum of products of the data in register 0 and the data in register 10.

Receiving the arithmetic instruction, the data control section 20 reads the number of memory-mapped registers from the setting information holding section 41. Then, since the number of memory-mapped registers is 8, it is seen that register 8 to register 15 are used as memory-mapped registers. As a result, the data control section 20 finds that the selected register 0 is not a memory-mapped register and register 10 is a memory-mapped register (step S12).

Figure 14:
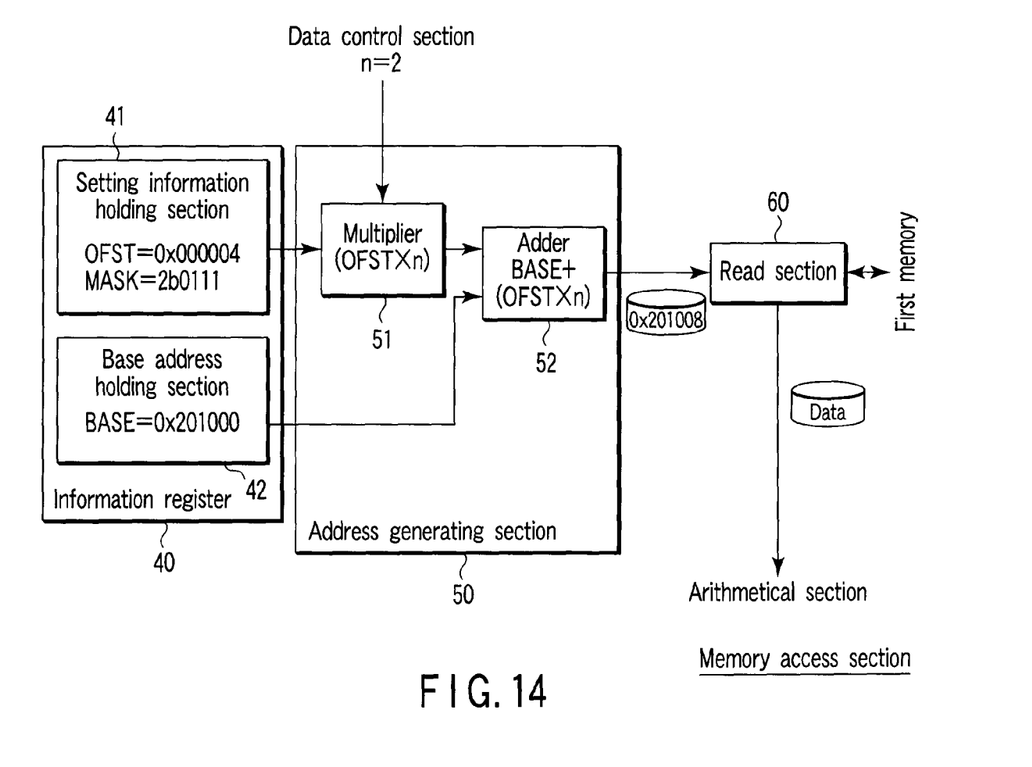
FIG. 14 is a block diagram of the memory access section included in the system LSI of the first embodiment.

Accordingly, the data control section 20 reads the data from register 0 and outputs the data to the arithmetical section 23 (step S14). As for register 10, the data control section 20 calculates the address of the corresponding area in the first memory 11 (step S15). FIG. 14 shows a state of the memory access section 21 in calculating addresses. FIG. 14 is a block diagram of the memory access section 21.

First, the adder 52 of the address generating section 50 reads base address BASE="0x201000" from the base address holding section 42. Moreover, the multiplier 51 reads address offset value OFST="0x000004" from the setting information holding section 41 (step S20). The data control section 20 reads the number of memory-mapped registers MASK="2b0111" from the setting information holding section 41 (step S21). Since the data control section 20 has already referred to the number of memory-mapped registers in step S12, if the data control section 20 has stored the number, step S21 may be omitted. As described above, it can be determined from the number of memory-mapped registers what number register in the memory-mapped registers is the relevant register 10 (step S22). Then, as seen from FIG. 11, if register 8 is a 0-th register, register 10 is a second register. Accordingly, the data control section 20 outputs register order n=2 to the multiplier 51. Then, the address generating section 50 calculates an address (step S23). Specifically, the multiplier 51 calculates (OFST×n)="0x000004"×2="0x000008". Then, the adder 52 calculates (BASE+"0x000008")= "0x201008". As a result, the address in the first memory 11 corresponding to register 10 is calculated.

The result of the addition at the adder 52 is given to the read section 60. The read section 60 reads the data held in address "0x201008" in the first memory 11 and outputs the data to the arithmetical section 23 (step S16). Then, the arithmetical section 23 performs MAC processing.

Figure 15:
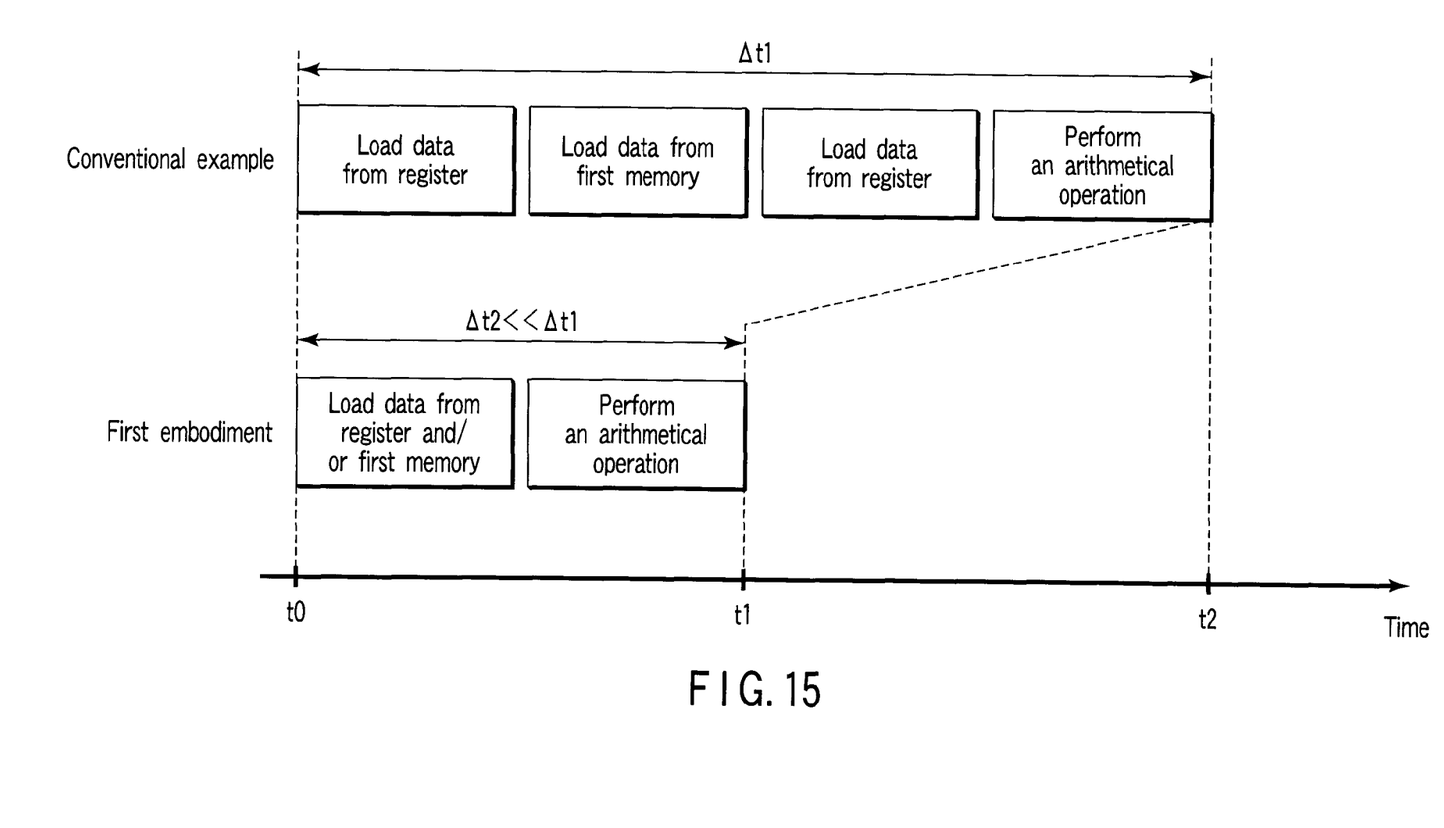
FIG. 15 is a timing chart to help explain the flow of the operation of the system LSI according to the first embodiment and that of an LSI with a conventional configuration.

As described above, the system LSI of the first embodiment can improve its processing efficiency. In the system LSI of the first embodiment, the memory-mapped register and the memory access section 21 are provided in the coprocessor 3. When the memory-mapped register is accessed, the memory access section 21 reads data directly from the first memory 11 of the main processor 2. Therefore, the time required to read data can be made shorter and therefore the processing efficiency of the system LSI can be improved. This will be explained using FIG. 15. FIG. 15 is a timing chart to help explain a process necessary for one MAC process in the case of a conventional configuration without the memory access section 21 and in the case of the configuration of the first embodiment.

First, the case of the conventional configuration will be explained. Suppose, of two items of data necessary for MAC processing, one has been held in the register and the other has not been held. Then, first, one item of data is read from the register. Since the other item of data has not been held in the register, the data is loaded from the main processor into the coprocessor in the next cycle. Then, in the next cycle, the data loaded from the main processor into the coprocessor is read from the register. Thereafter, at last, the MAC processing is performed. Suppose the time required to carry out these processes is Δt1.

In contrast, in the first embodiment, when receiving an arithmetic instruction, the data control section 20 determines whether the memory-mapped register has been accessed. If the memory-mapped register has not been accessed, the data control section 20 reads data from any one of the register group 22. If the memory-mapped register has been accessed, the memory access section 21 reads data directly from the first memory 11. This process can be carried out in the same cycle. In the next cycle, MAC processing can be done. Therefore, time Δt2 necessary for these processes is much shorter than time Δt1.

In the instruction given to the coprocessor 3 in multimedia processing, such as audio codec, the number of data load instructions is generally very much larger than the number of arithmetic instructions. Therefore, even if many computing units having a complex arrangement are used, the delivery of data is frequently too late. With the first embodiment, however, the data load speed can be made much shorter than that in the conventional equivalent. Accordingly, the processing efficiency particularly in a multimedia processing LSI can be improved remarkably.

Figure 16:
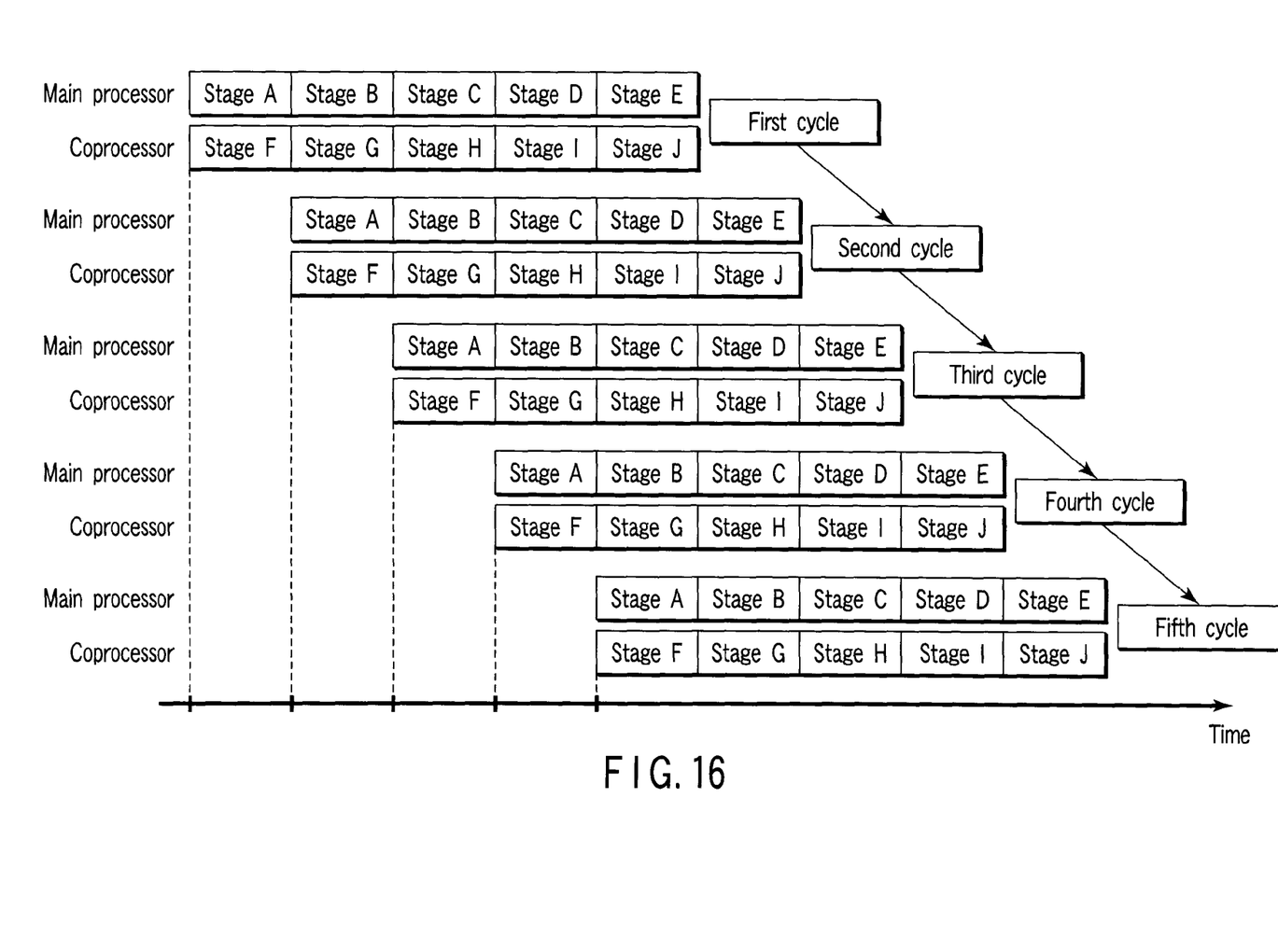
FIG. 16 is a timing chart to help explain the flow of a pipeline process in the system LSI of the first embodiment.

In the multimedia processing LSI, the main processor 2 and coprocessor generally carry out a pipeline process. FIG. 16 is a timing chart to help explain the flow of processing in the main processor 2 and coprocessor 3. As shown in FIG. 16, the main processor 2 has five processing stages, stage A to stage E. In addition, the coprocessor 3 has five processing stages, stage F to stage J. In each processing cycle, the processing stages ranging from stage A to stage E and the processing stages ranging from stage F to stage J are carried out at the same time. Then, after the first processing stage (stages A and F) is completed, the processes in stages A and F are started again in the next cycle.

With the conventional configuration, for example, when the coprocessor performs MAC processing in the third cycle, data has to be loaded into the coprocessor in the immediately preceding second cycle at the latest. If the loading is too late, the pipeline process of the coprocessor in the third cycle stalls. Once a stall has occurred, this has an adverse effect on subsequent cycles, which reduces the processing speed.

However, with the configuration of the first embodiment, even if data has not been loaded in the immediately preceding cycle, the pipeline process can be prevented from stalling, since the data is loaded directly from the main processor in the immediately preceding cycle.

Second Embodiment

Figure 17:
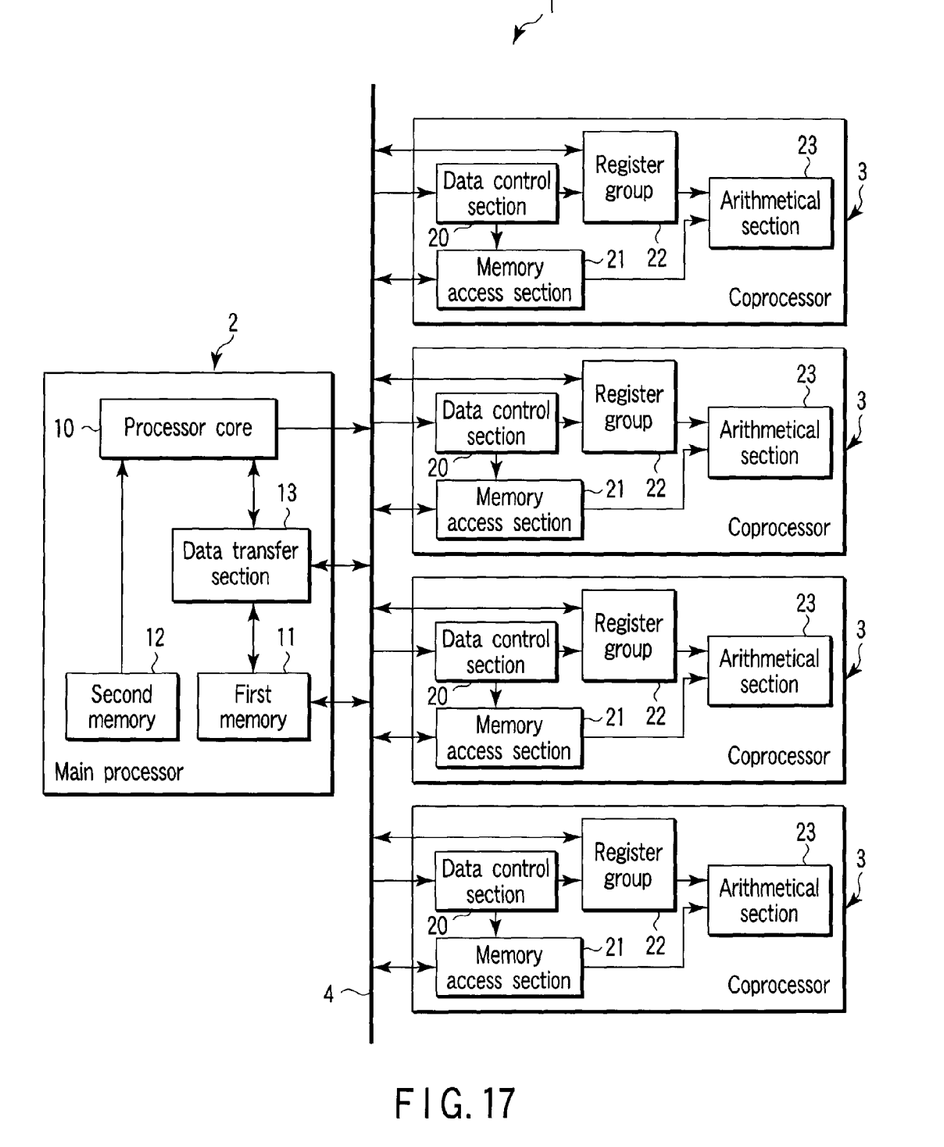
FIG. 17 is a block diagram of a system LSI according to a second embodiment of the invention.

Next, a processor and a processor system according to a second embodiment of the invention will be explained. The second embodiment relates to a processor system which has a plurality of units of the coprocessor 3 explained in the first embodiment. FIG. 17 is a block diagram of a system LSI according to the second embodiment.

As shown in FIG. 17, the system LSI 1 of the second embodiment comprises a main processor 2, four coprocessors 3, and a bus 4. The configuration and operation of the main processor 2 and coprocessors 3 are the same as those explained in the first embodiment. Instructions and data are exchanged between the main processor 2 and the coprocessors 3 via the bus 4. Of course, the number of coprocessors 3 is not limited to 4 and may be, for example, 2 or 8 or more.

As described above, even when the LSI has a plurality of coprocessors 3, the first embodiment can be applied to this configuration. The larger the number of coprocessors 3, the larger the number of data load instructions exchanged with the main processor 2. Consequently, the effect explained in the first embodiment is obtained noticeably.

Third Embodiment

Figure 18:
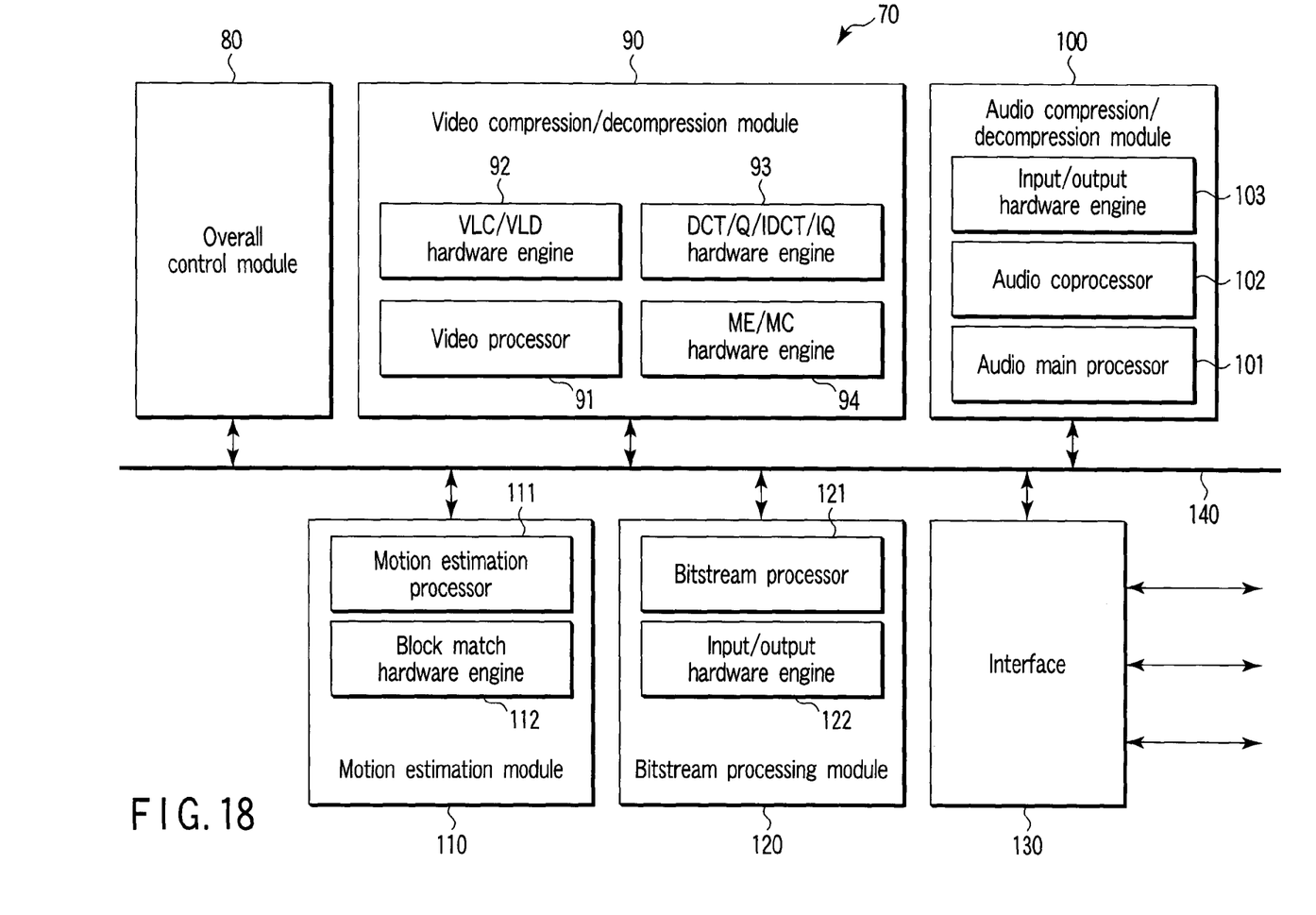
FIG. 18 is a block diagram of an image processing LSI according to a third embodiment of the invention.

Next, an image processing apparatus according to a third embodiment of the invention will be explained. The third embodiment relates to an image processing LSI including a system LSI 1 according to the first embodiment or second embodiment. FIG. 18 is a block diagram of the image processing LSI of the third embodiment.

As shown in FIG. 18, an LSI 70 includes an overall control module 80, a video compression/decompression module 90, an audio compression/decompression module 100, a motion estimation module 110, a bit-stream processing module 120, an interface 130, and a bus 140.

The overall control module 80 controls the operation of the video compression/decompression module 90, audio compression/decompression module 100, motion estimation module 110, bit-stream processing module 120, and interface 130 via the bus 140.

The video compression/decompression module 90 compresses and decompresses video data. The video compression/decompression module 90 includes a video processor 91, a variable-length coder/decoder (VLC/VLD) hardware engine 92, a DCT/Q/IDCT/IQ hardware engine 93, and an ME/MC hardware engine 94. Here, DCT means discrete cosine transform, Q quantization, IDCT inverse discrete cosine transform, IQ inverse quantization, ME motion estimation, and MC motion compensation. The video processor 91 controls the operation of the hardware engines 92 to 94. The hardware engine 92 decodes and encodes video data. The hardware engine 93 particularly performs discrete cosine transform, quantization, inverse discrete cosine transform, inverse quantization. The hardware engine 94 carries out processes related to motion estimation and motion compensation.

The audio compression/decompression module 100 compresses and decompresses audio data. The module 100 includes an audio main processor 101, an audio coprocessor 102, and an input/output hardware engine 103. The main processor 101 controls the operation of the audio coprocessor 102 and input/output hardware engine 103. The coprocessor 102 receives arithmetic instructions and data from the main processor 101 and performs arithmetical operations necessary for audio processing. The arithmetical operations necessary for audio processing include, for example, addition, subtraction, logical operation, shift operation, concatenated shift operation, multiplication and accumulation (MAC) and multiplication. The hardware engine 103 supervises the process of inputting and outputting audio data.

The motion estimation module 110 includes a motion estimation processor 111 and a block match hardware engine 112. The motion estimation processor 111 controls the operation of the hardware engine 112. The hardware engine 112 performs, for example, (8×8) pixel block matching. With the matching operation, the hardware engine 112 estimates the motion of the object in the image and outputs the result to the hardware engine 94.

The bit-stream processing module 120 includes a bit-stream processor 121 and an input/output hardware engine 121. The processor 121 processes data externally supplied by streaming or data to be output to the outside by streaming. The hardware engine 122 supervises the operation of inputting and outputting data.

The interface 130 supervises the exchange of data between the LSI 70 and the outside.

With the above configuration, the main processor 2 and coprocessor 3 explained in the first or second embodiment are provided in the audio main processor 101 and audio coprocessor 102. Specifically, data necessary for the compression or decompression of audio is held in the first memory 11 and register group 22. Then, the arithmetical section 23 performs addition, subtraction, logical operation, shift operation, concatenated shift operation, MAC, and multiplication.

As described above, the configurations explained in the first and second embodiments can be applied to the image processing LSI and particularly can improve the audio processing efficiency.

Fourth Embodiment

Figure 19:
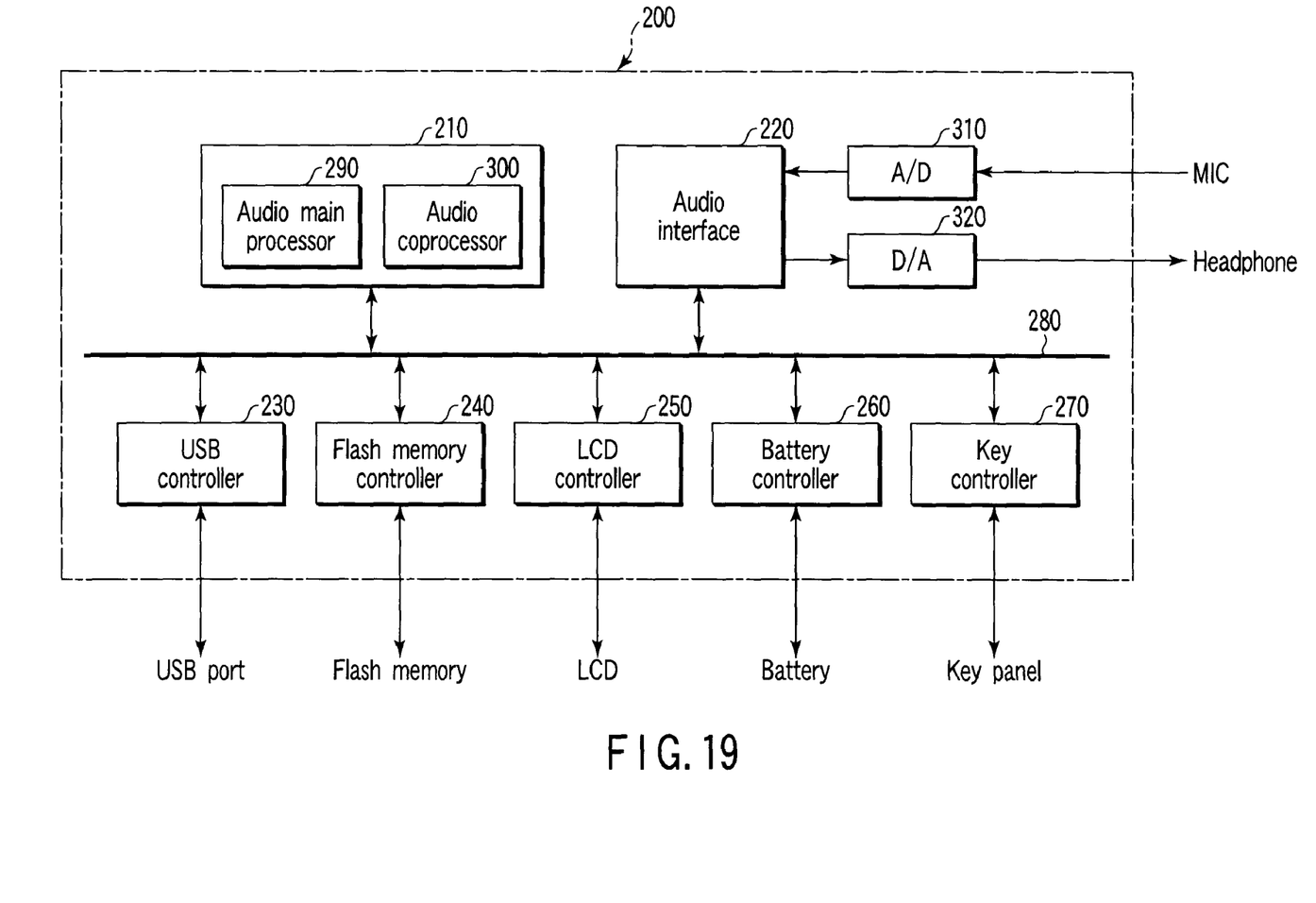
FIG. 19 is a block diagram of an LSI installed in a portable music player according to a fourth embodiment of the invention.

Next, a portable music player according to a fourth embodiment of the invention will be explained. The fourth embodiment relates to an audio processing LSI to which the system LSI according to the first embodiment or second embodiment has been applied. FIG. 19 is a block diagram of the audio processing LSI.

As shown in FIG. 19, the LSI 200 includes an audio compression/decompression module 210, an audio interface 220, a USB controller 230, a flash memory controller 240, an LCD controller 250, a battery controller 260, a key controller 270, a bus 280, an analog-to-digital converter 310, and a digital-to-analog converter 320.

The audio compression/decompression module 210 includes an audio main processor 290 and an audio coprocessor 300. The audio main processor 290 controls various controllers via the bus 280. The analog-to-digital converter 310 digitizes external analog audio, thereby obtaining serial data. The external analog audio is audio data input from, for example, a microphone, a Line In terminal, or an FM radio. The audio interface 220 converts the serial data obtained by the analog-to-digital converter 310 into parallel data in a format that enables the audio compression/decompression module to do processing. Moreover, the audio interface 220 converts the parallel audio data decompressed by the audio main processor 290 into serial data. The digital-to-analog converter 320 digital-to-analog-converts the serial data obtained at the audio interface 220, thereby obtaining analog audio. The analog audio is output by, for example, headphones.

The USB controller 230 controls USB ports. For example, the audio files supplied by, for example, the personal computer are input to the LSI 200 via the USB port.

The flash memory controller 240 controls a flash memory provided outside the LSI 200. The flash memory, which is a nonvolatile semiconductor memory, stores compressed music data. The LSI 200 decompresses the music data stored in the flash memory, thereby reproducing the music data. Of course, a hard disk or the like may be used in place of the flash memory.

The LCD controller 250 controls the LCD connected to the LSI 200.

The battery controller 260 controls the remaining amount of power in a rechargeable battery or a dry battery connected to the LSI 200.

The key controller 270 receives a key externally input from a key panel including a playback button, a playback stop button, or a numeric keypad and informs the audio main processor 290 of the key input event.

With the above configuration, the audio main processor 290 has the same configuration as that of the main processor 2 and the audio coprocessor 300 has the same configuration as that of the coprocessor 3 as explained in the first and second embodiments. In audio processing, the speed of MAC processing limits the signal processing speed. Therefore, using the configurations explained in the first and second embodiments makes it possible to improve the computing capability of the audio coprocessor 300 and lengthen the service life of the battery important to portable devices.

As explained above, with the configurations according to the first to fourth embodiments, the throughput of data input to the computing unit increases and therefore the computing capability of the coprocessor can be improved. Moreover, even when the data necessary for arithmetical operations has not been stored in the register of the coprocessor, the instruction density can be improved by specifying a memory-mapped register in an arithmetic instruction. Specifically, with the conventional configuration, when the necessary data has not been held in the register, an arithmetic instruction has to be issued again after the necessary data is loaded into the register. However, in the embodiments, specifying a memory-mapped register makes it possible to read the data directly from the first memory 11 and performs an arithmetical operation.

In the embodiments, the number of registers included in the register group 22 has been 16. This is because the register number specifying field in an arithmetic instruction contains 4 bits. For example, if the register number specifying field contains 5 bits, the number of registers can be set to 32. If the register number specifying field contains 6 bits, the number of registers can be set to 64.

Furthermore, in the embodiments, only one of the two items of data has corresponded to a memory-mapped register. Of course, the two items of data may correspond to memory-mapped registers. Conversely, none of the two items of data may correspond to memory-mapped registers. Moreover, the number of registers selected by an arithmetic instruction is not limited to 2 and may be 3 or more.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A processor having a first operation mode which allows a first area of a first register to be accessed and a second operation mode which allows a second area of the first register to be accessed, the processor comprising:

the first register which includes the first area capable of holding data and the second area provided in the second operation mode and inhibited from holding data;

a control section which generates an address corresponding to the second area accessed in the second operation mode and is capable of reading data from an external memory device using the generated address; and an arithmetical section which, in the first operation mode, performs an arithmetical operation using the data held in the accessed first area and, in the second operation mode, performs an arithmetical operation using the data read at the control section.

2. The processor according to claim 1, wherein the first register includes a plurality of second registers each of which is capable of holding the data and, in the second operation mode, any of which perform as the second area and the rest of which perform as the first area, and the control section includes a setting value holding section which holds the number of the second registers performing as the second area and the relationship between the second registers performing as the second area and the address, an address generating section which generates the address corresponding to the accessed second register using the relationship held in the setting value holding section when the second register performing as the second area is accessed in the second operation mode, and a reading section which is capable of reading the data from the external memory device on the basis of the address generated at the address generating section and outputs the read-out data to the arithmetical section.

3. The processor according to claim 2, wherein the setting value holding section, when said plurality of second registers performs as the second area, holds a begin address in the memory device corresponding to first one of the second registers and information on a difference in the address between the second registers, and the address generating section calculates the address by adding the begin address held in the setting value holding section and the information on the difference needed.

4. A processor system comprising:

a first processor which includes a memory device holding data; and a second processor which includes a first register and performs an arithmetical operation on the data according to an arithmetic instruction given by the first processor, the arithmetic instruction including an access instruction for a first area of the first register in a first operation mode and an access instruction for a second area of the first register in a second operation mode, the second processor including the first register which includes the first area capable of holding data and the second area provided in the second operation mode and inhibited from holding data;

a control section which generates an address in the memory device corresponding to the second area accessed in the second operation mode and is capable of reading data from the memory device using the generated address; and an arithmetical section which, in the first operation mode, performs an arithmetical operation using the data held in the accessed first area and, in the second operation mode, performs an arithmetical operation using the data read at the control section.

5. The processor system according to claim 4, wherein the first register includes a plurality of second registers each of which is capable of holding the data and, in the second operation mode, any of which perform as the second area and the rest of which perform as the first area, the arithmetic instruction includes contents of an operation at the arithmetical section and a select instruction to select any one of the second registers, and the control section includes a setting value holding section which holds the number of the second registers performing as the second area and the relationship between the second registers performing as the second area and the address, an address generating section which generates the address corresponding to the selected second register using the relationship held in the setting value holding section when the second register selected by the select instruction performing as the second area, and a reading section which reads the data from the memory device on the basis of the address generated at the address generating section and outputs the read-out data to the arithmetical section.

6. The processor system according to claim 5, wherein the setting value holding section, when said plurality of second registers performs as the second area, holds a begin address in the memory device corresponding to first one of the second registers and information on a difference in address between the second registers, and the address generating section calculates the address by, on the basis of the select instruction, adding the begin address held in the setting value holding section and the information on the difference needed.

7. An image processing apparatus comprising:

a video processing circuit which carries out a video compression process and a video decompression process; and an audio processing circuit which carries out an audio compression process and an audio decompression process, the audio processing circuit including a first processor which includes a memory device holding data; and a second processor which includes a first register and performs an arithmetical operation on the data according to an arithmetic instruction given by the first processor, the arithmetic instruction including an access instruction for a first area of the first register in a first operation mode and an access instruction for a second area of the first register in a second operation mode, the second processor including the first register which includes the first area capable of holding data and the second area provided in the second operation mode and inhibited from holding data;

a control section which generates an address in the memory device corresponding to the second area accessed in the second operation mode and is capable of reading data from the memory device using the generated address; and an arithmetical section which performs an arithmetical operation necessary for the audio compression and decompression processes using the data held in the accessed first area in the first operation mode and using the data read in the control section in the second operation mode.

8. The apparatus according to claim 7, wherein the first register includes a plurality of second registers each of which is capable of holding the data and, in the second operation mode, any of which perform as the second area and the rest of which perform as the first area, the arithmetic instruction includes contents of an operation at the arithmetical section and a select instruction to select any one of the second registers, and the control section includes a setting value holding section which holds the number of the second registers performing as the second area and the relationship between the second registers performing as the second area and the address, an address generating section which generates the address corresponding to the selected second register using the relationship held in the setting value holding section when the second register selected by the select instruction performing as the second area, and a reading section which reads the data from the memory device on the basis of the address generated at the address generating section and outputs the read-out data to the arithmetical section.

9. The image processing apparatus according to claim 8, wherein the setting value holding section, when said plurality of second registers perform as the second area, holds a begin address in the memory device corresponding to first one of the second registers and information on a difference in address between the second registers, and the address generating section calculates the address by, on the basis of the select instruction, adding the begin address held in the setting value holding section and the information on the difference needed.

* * * * *